United States Patent

Billmers et al.

[11] Patent Number: 6,001,927
[45] Date of Patent: Dec. 14, 1999

[54] THIXOTROPIC PAINT COMPOSITIONS CONTAINING HYDROPHOBIC STARCH DERIVATIVES

[75] Inventors: Robert L. Billmers, Stockton, N.J.; Rajeev Farwaha, Brampton, Canada; Godric S. Yearwood, Scarborough, Canada; Lien Phan, Mississauga, Canada

[73] Assignee: National Starch and Chemical Investment Holding Corporation, Wilmington, Del.

[21] Appl. No.: 09/154,053

[22] Filed: Sep. 16, 1998

[51] Int. Cl.$^6$ .................. C08K 5/07; C08L 3/00
[52] U.S. Cl. ............. 524/732; 524/734; 536/48; 536/49
[58] Field of Search .................... 524/732, 734; 536/48, 49

[56] References Cited

U.S. PATENT DOCUMENTS

| | | |
|---|---|---|
| 2,661,349 | 12/1953 | Caldwell et al. |
| 4,322,322 | 3/1982 | Lambrechts et al. .......... 524/734 |
| 4,845,152 | 7/1989 | Palmer .......... 524/734 |
| 5,672,699 | 9/1997 | Billmers et al. .......... 536/102 |

*Primary Examiner*—Nathan M. Nutter
*Attorney, Agent, or Firm*—John D. Thallemer

[57] ABSTRACT

Latex paint compositions containing water, pigment and a latex wherein the latex is prepared by emulsion polymerization of at least one ethylenically unsaturated monomer in the presence of 0.1 to 0.2 pphm of at least one hydrophobically modified starch having the structure

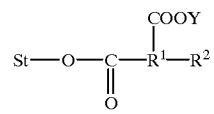

In the above structure, St is a starch base material, $R^1$ is a dimethylene or trimethylene group, $R^2$ is selected from the group consisting of alkyl, alkenyl, aralkyl and aralkenyl groups having 2 to 20 carbon atoms, and Y is selected from the group consisting of hydrogen, alkali metal, alkaline earth metal and ammonium. The hydrophobically modified starch is the reaction product of starch and an anhydride moiety and provides the latex paint with improved rheological properties and allows for easier spreading and less dripping of paint.

21 Claims, No Drawings

THIXOTROPIC PAINT COMPOSITIONS CONTAINING HYDROPHOBIC STARCH DERIVATIVES

FIELD OF THE INVENTION

This invention relates to paint compositions containing a critical range of hydrophobically modified starch which provides paint compositions with improved rheological properties and allows for easier spreading and less dripping of the paint.

BACKGROUND OF THE INVENTION

Emulsion polymers used in paint formulations are generally prepared using a stabilizing agent or protective colloid in order to prevent coalescence of polymer particles, with subsequent precipitation of the particles or coagulation of the product. Examples of stabilizing agents include polyvinyl alcohol and water soluble cellulose derivatives such as carboxymethyl cellulose, hydroxy methyl, ethyl or propyl cellulose. Paints prepared with such emulsion polymers, however, are characterized by poor viscosity control and large particle size.

More recently, starch derivatives have been used as stabilizing agents in the preparation of emulsion polymers. U.S. Pat. No. 4,322,322 describes hydroxypropyl and hydroxyethyl starches which are used as protective colloids in the preparation of water containing vinyl acetate copolymer dispersions. U.S. Pat. No. 4,845,152 describes polyvinyl ester emulsions for use as tape joint compounds. The emulsions in U.S. Pat. No. 4,845,152 are prepared by the emulsion polymerization of vinyl ester monomers and polymerizable comonomers using as a stabilizer a hydrophobically modified starch, specifically an alkenyl succinate starch. However, the alkenyl succinate starch is prepared by a standard esterification process wherein the reagent and starch suspended in water are mixed under alkaline conditions. The disadvantage of using hydrophobically modified starch prepared by the standard process as a stabilizer for paint emulsions is large particle size and poor gloss.

U.S. Pat. No. 5,672,699 describes a method for preparing a hydrophobically modified starch wherein the starch and anhydride reagent are mixed at low acidic pH to form a stable dispersion before being brought to alkaline reaction conditions. The method allows for the use of reagents having long hydrophobic side chains, such as dodecenyl and hexadecenyl.

Thus, it would be advantageous to prepare a paint composition using an emulsion polymer which is prepared with a hydrophobically modified starch as a stabilizer which overcomes viscosity control problems, large particle size, and poor gloss which are characteristic of prior art paint compositions.

SUMMARY OF THE INVENTION

Accordingly, it is an object of the invention to provide a paint composition.

It is another object of the invention to provide a paint composition with an emulsion polymer which is prepared using a hydrophobically modified starch as a stabilizing agent.

It is also an object of the invention to provide a paint composition which is characterized by less dripping and easier spreading.

With regard to the foregoing and other objects, the present invention provides a latex paint composition comprising water, pigment and a latex wherein the latex comprises dispersed colloidal particles of a polymer prepared by emulsion polymerization of at least one ethylenically unsaturated monomer in the presence of 0.1 to 2 pphm of at least one hydrophobically modified starch having the structure

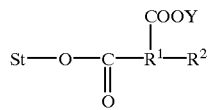

wherein St is a starch base material, $R^1$ is a dimethylene or trimethylene group, $R^2$ is selected from the group consisting of alkyl, alkenyl, aralkyl and aralkenyl groups having 2 to 20 carbon atoms, and Y is selected from the group consisting of hydrogen, alkali metal, alkaline earth metal and ammonium, wherein the hydrophobically modified starch is prepared by a method comprising:

(a) mixing a starch base material with water to form a slurry and adjusting the pH of the slurry to a pH of less than about 7, wherein the slurry contains from about 5 to about 45 weight percent of the starch base material;

(b) adding an anhydride moiety to the slurry wherein the anhydride moiety has the structure

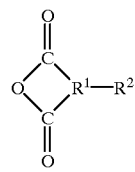

wherein $R^1$ is a dimethylene or trimethylene group, and $R^2$ is selected from the group consisting of alkyl, alkenyl, aralkyl and aralkenyl groups having 2 to 20 carbon atoms;

(c) agitating the slurry containing the starch base material, water and anhydride moiety to form a dispersion; and (d) adding an alkali material to the dispersion to adjust the pH of the dispersion to a pH of greater than about 7 in order to initiate the reaction between the starch base material and anhydride moiety to form a hydrophobically modified starch.

According to another aspect the invention provides a film formed by drying the latex paint composition as described above.

According to an additional aspect the invention provides an article comprising a substrate having at least one surface at least partially coated with the film as described above.

The hydrophobically modified starch of the invention provides latex paint compositions with a high viscosity and a degree of thixotropy, so that the viscosity of the paint composition decreases during application but regains its high value again after shear of application disappears. Thus, latex paint compositions prepared with the hydrophobically modified starch are characterized by less dripping and easier spreading. In addition, the dispersed colloidal particles of polymer in the latex paint have the required particle size distribution necessary to provide the latex paint with high gloss, stability, abrasion resistance and stain resistance.

DESCRIPTION OF THE INVENTION

This invention relates to latex paint compositions containing a hydrophobically modified starch. The hydrophobically modified starch functions as a stabilizing agent or protective colloid in preparing an emulsion polymer which is used in the manufacture of latex paints. The hydrophobically modified starch is the reaction product of starch and an anhydride moiety. The hydrophobically modified starch has the structure:

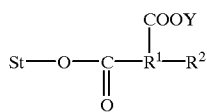

In the structure of the hydrophobically modified starch, St is a starch base material, $R^1$ is a dimethylene or trimethylene group, $R^2$ is selected from alkyl, alkenyl, aralkyl and aralkenyl groups having 2 to 20 carbon atoms, and Y is selected from hydrogen, alkali metal, alkaline earth metal and ammonium.

The hydrophobically modified starch is present in the emulsion in a critical range of from about 0.1 to about 2 parts per hundred monomer (pphm). Preferably, the hydrophobically modified starch is present in the emulsion in a critical range of from about 0.1 to about 1 pphm, more preferably from about 0.3 to about 0.7 pphm.

The hydrophobically modified starch is prepared by mixing a starch base material at a solids level of from about 5 to about 45%, preferably from about 25 to about 35% solids, with water to form a slurry. The pH of the slurry containing the starch base material and water is adjusted to a pH of less than about 7 by the addition of any inorganic or mineral acid such as hydrochloric or sulfuric acid.

The starch base material may be any of several granular starches, native, converted or derivatized. Such starches include those derived from any plant source including corn, potato, wheat, rice, sago, tapioca, waxy maize, sorghum and high amylose starch such as high amylose corn, i.e., starch having at least 40%, and more preferably at least 65% amylose content by weight. Starch flours may also be used as the starch base material. In addition, the starch base material may be the conversion products derived from any of the former starch base materials, such as, for example, dextrins prepared by hydrolytic action of acid and/or heat; fluidity or thin boiling starches prepared by enzyme conversions or mild acid hydrolysis; oxidized starches prepared by treatment with oxidants such as sodium hypochlorite; and derivatized starches such as cationic, anionic, amphoteric, non-ionic and crosslinked.

An anhydride moiety is added to the slurry containing the starch base material and water. The amount of anhydride moiety added to the starch base material and water slurry is from about 1 to 100 weight percent, more preferably from about 2 to about 60 weight percent, and most preferably from about 3 to about 10 weight percent, based on the weight of starch base material in the slurry. The anhydride moiety has the structure:

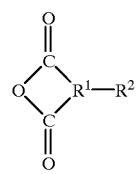

In the above structure of the anhydride moiety, $R^1$ is a dimethylene or trimethylene group, and $R^2$ is selected from alkyl, alkenyl, aralkyl and aralkenyl groups having 2 to 20 carbon atoms. Preferably, $R^2$ is an alkyl or alkenyl group having 5 to 18 carbon atoms, more preferably 8 to 12 carbon atoms.

$R^2$ may be joined to $R^1$ by means of a carbon-to-carbon bond (as in alkenyl succinic anhydride moiety) or through two carbon-to-carbon bonds (as in the adduct of maleic anhydride moiety with methyl pentadiene, or as in the cyclo-paraffinic cyclo-dicarboxylic acid anhydride moietys such as cyclo hexane 1,2-dicarboxylic acid anhydride moiety), or may be linked through an ether or ester linkage (as in octyloxy succinic anhydride moiety or in capryloxy succinic anhydride moiety).

The starch base material and water slurry containing the anhydride moiety is mixed at a pH of less than about 7 with sufficient agitation to form a dispersion. More preferably, the pH is from about 1 to about 6, and most preferably the pH is from about 2 to about 3. The amount of agitation required to form a stable dispersion will vary depending on the specific anhydride moiety and amounts of the reagents. Agitation can be accomplished by methods known in the art such as high speed mixing, injection through a venturi or emulsification.

Reaction of the starch base material and anhydride moiety is initiated and maintained by adjusting the pH of the dispersion to greater than about 7 by the addition of an alkali material. Preferably, the reaction between the starch base material and anhydride moiety is initiated and maintained at a pH of from about 7.1 to 11 and more preferably at a pH of from about 8 to about 9.

Any alkali material may be used to initiate and maintain the reaction between the starch base material and anhydride moiety to form a hydrophobically modified starch. Preferred alkali materials are alkali metal hydroxides and alkaline earth metal hydroxides or the Group IA or IIA hydroxides, oxides, carbonates or other salts. Examples of such alkali materials are sodium hydroxide, potassium hydroxide, calcium hydroxide, ammonium hydroxide, magnesium hydroxide, sodium carbonate and trisodium phosphate. Most preferably, the alkali material is sodium hydroxide.

The reaction between the starch base material and anhydride moiety may be conducted at a wide range of temperatures depending on the specific reagents used. Preferably, the reaction is conducted at a temperature of from about 10° C. to about 50° C., more preferably from about 25° C. to about 40° C. The hydrophobically modified starch product is recovered by standard techniques such as filtration and centrifugation.

The hydrophobically modified starch functions as a stabilizing agent or protective colloid in preparing an emulsion polymer which is used in the manufacture of latex paints. The amount of hydrophobically modified starch used to prepare the emulsion is from about 0.1 to about 5 weight percent, preferably from about 0.5 to 1 weight percent, based on the total weight of monomers in the emulsion.

The emulsion polymer is prepared from at least one ethylenically unsaturated monomer. The ethylenically unsaturated monomer is selected from vinyl esters, alpha olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, sulfonated monomers, vinyl amide monomers, and anhydrides. A combination of ethylenically unsaturated monomers may also be used in the method of the invention.

Suitable vinyl esters are, for example, vinyl acetate, vinyl formate, vinyl propionate, vinyl butyrate, vinyl isobutyrate, vinyl valerate, vinyl 2-ethyl-hexanoate, etc. Suitable alkyl esters of acrylic and methacrylic acid are, for example, methyl acrylate, methyl methacrylate, ethyl acrylate, ethyl methacrylate, butyl acrylate, etc. Suitable substituted or unsubstituted mono and dialkyl esters of unsaturated dicarboxylic acids are, for example, substituted and unsubstituted mono and dibutyl, mono and diethyl maleate esters as well as the corresponding fumarates. Suitable unsaturated carboxylic acids are, for example, crotonic acid, acrylic acid, methacrylic acid, fumaric acid, maleic acid, itaconic acid, citraconic acid, and their alkyl esters, etc.

Suitable vinyl aromatic monomers are, for example, styrene, 3-isopropenyl-α, α-dimethylbenzyl isocyanate 1-vinyl napthalene, 2-vinyl napthalene, 3-methyl styrene, 4-propyl styrene, t-butyl styrene, etc. Suitable acrylamide based monomers are, for example, acrylamide, N, N dimethylacrylamide, N-octyl acrylamide, N-methylol acrylamide, dimethylaminoethylacrylate, etc. Suitable cyclic monomers are, for example, vinyl pyrrolidone, vinyl imidazolidone, vinyl pyridine, etc. Suitable sulfonated monomers are, for example, 2-acrylamido-2-methyl propane sulfonic acid, sodium methallyl sufonate, sodium vinyl sulfonate, sulfonated sytrene, etc. Suitable vinyl amide monomers are, for example, N-vinyl formamide, N-vinyl acetamide, etc. Suitable α-olefin based monomers are, for example, $C_4$–$C_{20}$ based alkyl monomers such as 1-octene, butylene, 1-dodecene, etc. The ethylenically unsaturated monomer is preferably styrene. Suitable anhydride monomers are maleic anhydride and itaconic anhydride.

A carboxyl-containing monomer may also be used in preparing the emulsion polymers in order to impart mechanical stability to the latex paint composition during mixing of the emulsion polymer with the other components of the paint composition such as the pigments, fillers and the like. Such carboxyl-containing monomers are generally used in an amount of less than about 1 weight percent based on the total weight of monomer. More preferably, the carboxyl-containing monomers are used in an amount of less than about 0.5 weight percent.

The carboxyl-containing monomer contains at least one carboxyl group attached directly to the olefinic carbon. Preferably, the carboxyl-containing monomer is selected from α,β-ethylenically unsaturated $C_3$–$C_8$ monocarboxylic acids, α,β-ethylenically unsaturated $C_4$–$C_8$ dicarboxylic acids and the anhydride thereof, and the $C_4$–$C_8$ alkyl half-esters of the α,β-ethylenically unsaturated $C_4$–$C_8$ dicarboxylic acids. More preferably, the carboxyl-containing monomer is selected from acrylamido methyl propane sulfonic acid, styrene sulfonate, sodium vinyl sulfonate, acrylic acid and methacrylic acid, and the $C_4$–$C_8$ alkyl half esters of maleic acid, maleic anhydride, fumaric acid, and itaconic acid.

The latex paint composition may also contain from about 0.2 to about 2 weight percent, based on the total weight of monomers of the polymerized residue of at least one wet adhesion monomer. Wet adhesion monomers are well known in the art and include N-(2-methacryloyloxyethyl) ethylene urea, N-(2-methacryloxyacetamidoethyl)-N, N'-ethyleneurea, allylalkyl ethylene urea, N-methacrylamidomethyl urea, N-methacryoyl urea, N-(methacrylamido)ethyl urea (DV2422, Rhone-Poulenc), allyl carbamato ethyl ethylene urea, and alkyl ureido wet adhesion monomer (Sipomer WAM®, Rhone Poulenc).

The process for preparing the emulsion polymers including the process conditions such as time and temperature, initiator, surfactants, buffers and other additives are well known to those skilled in the art of formulating emulsions to be used in latex paint compositions.

The emulsion polymers used to prepare the latex paint compositions are thermoplastic. There is no crosslinking of the emulsion polymer during polymerization, nor does the emulsion polymer undergo crosslinking during film formation once applied to a substrate, either chemically, thermally or by irradiation.

The hydrophobically modified starch of the invention provides latex paint compositions with a high viscosity and a degree of thixotropy, so that the viscosity of the paint composition decreases during application but regains its high value again after shear of application disappears. Thus, latex paint compositions prepared with the hydrophobically modified starch are characterized by less dripping and easier spreading. In addition, the dispersed colloidal particles of polymer in the latex paint have the required particle size distribution necessary to provide the latex paint with high gloss, stability, abrasion resistance and stain resistance.

The following nonlimiting examples illustrate further aspects of the invention. In the examples, the particle sizes and distributions were determined by means of light scattering using a BI-90 equipment (Brookhaven Instruments).

EXAMPLE 1

Method for preparing four hydrophobically modified starch samples according to the acidic pH method of the invention.

In a Waring blender cup, 500 g of distilled water was mixed with 250 g of four starches (waxy maize). The starch and water were mixed under low speed conditions for approximately one minute and then the pH was adjusted using dilute HCl to pH of 2.0. Twenty-five (25) g of an anhydride moiety as set forth in Table I was added to each starch slurry. Each of the starch slurries was mixed at high speed for one minute. The suspensions were poured into a 2 L stainless steel beaker which was fitted with a pH controller attached to a metering pump to maintain the pH of the reaction. The metering pump was supplied with 3% NaOH to maintain the pH of 8.0 for the duration of the reaction. The reaction time was 12 hours.

The reaction was considered to be complete when the pH was constant without the addition of NaOH solution for more than 30 minutes. The reaction pH was adjusted to 5.5 to 6.0 with dilute acid (HCl) and the products were filtered. Purification was obtained by resuspending in 500 mL of distilled water, filtering and washing with 250 mL of distilled water. Resuspension in 500 mL of 99% isopropanol, followed by filtration and washing with water gave the purified product. The four starch samples are identified as Samples A–D in Table I. The percent bound anhydride reagent and the test results are summarized in Table I.

EXAMPLE 2

Method for preparing two hydrophobically modified starch samples according to a standard esterification method at alkaline pH.

In a Waring blender cup, 500 g of distilled water was mixed with 250 g of two starches (waxy maize). The starch and water were mixed under low speed conditions. Twenty-five (25) g of an anhydride moiety as set forth in Table I was added to each starch slurry. The suspensions were poured into a 2 L stainless steel beaker which was fitted with a pH controller attached to a metering pump to maintain the pH of the reaction. The metering pump was supplied with 3% NaOH to maintain the pH of 8.0 for the duration of the reaction.

The reaction was considered to be complete when the pH was constant without the addition of NaOH solution for more than 30 minutes. The reaction pH was adjusted to 5.5 to 6.0 with dilute acid (HCl) and the products were filtered. Purification was obtained by resuspending in 500 mL of distilled water, filtering and washing with 250 mL of distilled water. Resuspension in 500 mL of 99% isopropanol, followed by filtration and washing with water gave the purified product. The two control starch samples are identified as Samples E and F in Table I. The percent bound anhydride reagent and the test results are summarized in Table I.

TABLE I

| Ex | Starch | Description | Temperature | Bound Reagent | Viscosity at 10 RPM | Viscosity at 50 RPM | % Change |
|---|---|---|---|---|---|---|---|
| 2-E | Waxy | 3% OSA, (Control) | RT | 2.6 | 3050 | 1220 | 40% |
| 1-A | Waxy | 3% OSA, | RT | 2.6 | 4250 | 1560 | 37% |
| 1-B | Waxy | 3% DDSA, | RT | 2.3 | 3550 | 1380 | 39% |
| 2-F | Waxy Fluidity | 3% OSA, (Control) | 150° F. | 2.6 | 70 | 60 | |
| 1-C | Waxy Fluidity | 3% OSA | 150° F. | 2.7 | 85 | 80 | |
| 1-D | Waxy Fluidity | 3% DDSA | 150° F. | 2.5 | 195 | 120 | |

DDSA is dodecenyl succinic anhydride moiety
OSA is octenyl succinic anhydride moiety The test results in Table I clearly show that hydrophobically modified starches prepared using the acidic pH method of the invention exhibit significantly higher viscosities at similar bound anhydride levels as compared to the control starch samples which were prepared using the standard esterification method at alkaline pH.

EXAMPLE 3

Preparation of Vinyl Acrylic Latex with Hydroxyethylcellulose (CELLOCIZE QP-09).

| | Grams | PPHM |
|---|---|---|
| Initial Charge: | | |
| Water | 470.2 | 72.4 |
| CELLOCIZE QP-09 | 2.78 | 0.5 |
| POLYSTEP A-16 | 6.5 | 1.0 |
| TRITON X-305 | 38.9 | 6.0 |
| Sodium Acetate | 0.62 | 0.1 |
| COLLOID 643 | 0.62 | 0.1 |
| Seed Monomer: | | |
| Vinyl Acetate | 109.7 | 14.18 |
| Catalyst I: | | |
| Water | 15.15 | 2.33 |
| Ammonium Persulfate | 0.52 | 0.08 |
| Monomer Slow Add: | | |
| Vinyl Acetate | 581.65 | 75.19 |
| Butyl Acrylate | 82.26 | 10.63 |
| Acrylic Acid | 1.3 | 0.2 |
| Catalyst Slow Add: | | |
| Water | 150.13 | 23.13 |
| Ammonium Persulfate | 0.83 | 0.13 |
| Scavenger System: | | |
| Water | 30.41 | 4.05 |
| RONGALIT C | 0.96 | 0.15 |
| Ferrous Sulfate | 0.05 | 0.007 |
| t-BHP | 1.21 | 0.19 |
| Post Addition System: | | |
| Water | 5.37 | 0.44 |
| DREWPLUS L-475 | 0.55 | 0.08 |
| KATHON LX | 0.29 | 0.04 |

The Initial Charge was added to a reactor and agitation was set at 120 rpm. The reactor was heated to 60° C. and the Seed Monomer was added. The reactor was heated to 64° C. and Catalyst I was added. The reactor was heated to 77° C. and Monomer Slow Add was begun which lasted for 4 hours. The reaction temperature was maintained at 77° C. for 10 minutes. The reactor was cooled to 65° C. and the Scavenger System was added. The reactor was cooled to 50° C. and the Post Addition System was added. The reactor was cooled to 25° C. and the pH of the vinyl acrylic latex was adjusted to pH 5.5. The test results are summarized in Table II.

EXAMPLE 4

Preparation of Vinyl Acrylic Latex according to the procedure and amounts used in Example 3 except that the hydroxyethylcellulose (CELLOCIZE QP-09) was replaced with an equal amount of the hydrophobically modified starch (Ex. 1-C). The tests results are summarized in Table II.

EXAMPLE 5

Preparation of Vinyl Acrylic Latex according to the procedure and amounts used in Example 3 except that the hydroxyethylcellulose (CELLOCIZE QP-09) was replaced with 1.5 pphm of the hydrophobically modified starch (Ex. 1-C). The amount of water in the latex was adjusted accordingly. The tests results are summarized in Table II.

EXAMPLE 6

Preparation of Vinyl Acrylic Latex according to the procedure and amounts used in Example 3 except that the hydroxyethylcellulose (CELLOCIZE QP-09) was replaced with 1.0 pphm of the hydrophobically modified starch (Ex. 1-C). The amount of water in the latex was adjusted accordingly. The tests results are summarized in Table II.

EXAMPLE 7

The Starches were evaluated in a Semi-Gloss Paint Formula at 25% pigment volume concentration (PVC).

| Grind | |
|---|---|
| Water | 60.0 |
| Propylene Glycol | 40.0 |
| BYK - 156 | 5.0 |
| BYK - 034 | 2.0 |
| KRONOS 2020 | 290.0 |
| ASP 170 | 48.0 |
| Letdown | |
| Water | |
| IGEPAL CO - 630 | 2.0 |
| TEXANOL | 26.0 |
| Vinyl Acrylic Latex | 580.0 |
| ACRYSOL RM - 825 | |
| ACRYSOL RM - 1020 PR | 20.0 |
| BYK - 034 | 1.0 |
| KATHON LX 1.5% | 0.5 |
| AMP 95 | 1.0 |
| Total | 1469.50 |

Propylene Glycol is an anti-freeze additive.
BYK-156 is a acrylic copolymer.
BYK-034 is a defoamer
KRONOS 2020 is a titanium dioxide pigment.
KATHON LX is a preservative.
ASP-170 is an aluminum silicate extender pigment.
TEXANOL is an ester alcohol coalescing agent.

In a high speed dispersator, the Grind was dispersed. The Letdown was added to the dispersion and mixed for 15 minutes. The paints were evaluated in relation to their 20° and 60° gloss (ASTM D 523-80), freeze/thaw stability (ASTM D 2243), scrubbability (D 2486), using a lava soap aqueous solution as the scrub medium), viscosity in kreb units (ASTM D 4287). Paint samples are tested for five cycles. Table II shows the results of paints formulated with the described examples.

TABLE II

| | Ex. 3 | Ex. 4 | Ex. 5 | Ex. 6 |
|---|---|---|---|---|
| Amount of Starch Added Parts per Hundred Monomer (pphm) | None | 0.5 | 1.5 | 1.0 |
| % Solids | 53–56 | 53.69 | 53.53 | 54.42 |
| Particle Size (BI–90) nm | 302 | 386 | 686 | 586 |
| Paint Properties | | | | |
| Total Amount of Thickener Acrysol RM 825 added | 12.8 | 9.1 | 14.5 | 14.6 |
| Equilbrated Viscosity (KU) | 86.0 | 86.0 | 86.0 | 86.0 |
| Gloss 20/60 Degree | | | | |
| 1 day dry | 13.2/56.0 | 3.6/31.6 | 4.9/38.4 | 6.8/43.6 |
| 7 day dry | 12.5/55.0 | 3.0/27.6 | 4.1/35.4 | 5.1/39.8 |
| Levelling (Rating 1-poor, 10-best) | 7 | 7 | 6 | 7 |
| ICI (Poise) | 0.854 | 1.150 | 0.960 | 0.771 |
| Scrub (D2486 Method) Failure (Cycles) | 653 | 716 | 575 | 800 |
| Freeze/Thaw (5 cycles) Change in Viscosity (KU) | Fail | Fail | +13 KU | Fail |

The test results in Table II clearly show that the hydrophobically modified starch of the invention provides latex paint compositions with equivalent paint performance properties in terms of gloss, leveling, viscosity, scrub failure, and freeze/thaw as compared to paint compositions containing traditional thickeners. However, the paint compositions of the invention which are prepared with a critical range of hydrophobically modified starch exhibit significant improvements in thixotropy, so that the viscosity of the paint composition decreases during application but regains its high value again after shear of application disappears. Thus, latex paint compositions prepared with the hydrophobically modified starch are characterized by less dripping and easier spreading.

While the invention has been described with particular reference to certain embodiments thereof, it will be understood that changes and modifications may be made by those of ordinary skill in the art within the scope and spirit of the following claims.

What is claimed is:

1. In a latex paint composition comprising water, pigment and a latex wherein the latex comprises dispersed colloidal particles of a polymer prepared by emulsion polymerization of at least one ethylenically unsaturated monomer, the improvement comprising conducting the polymerization in the presence of from about 0.1 to about 2 pphm at least one hydrophobically modified starch having the structure

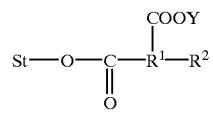

wherein St is a starch base material, $R^1$ is a dimethylene or trimethylene group, $R^2$ is selected from the group consisting of alkyl, alkenyl, aralkyl and aralkenyl groups having 2 to 20 carbon atoms, and Y is selected from the group consisting of hydrogen, alkali metal, alkaline earth metal and ammonium, wherein the hydrophobically modified starch is prepared by a method comprising:

(a) mixing a starch base material with water to form a slurry and adjusting the pH of the slurry to a pH of less than about 7, wherein the slurry contains from about 5 to about 45 weight percent of the starch base material;

(b) adding an anhydride moiety to the slurry wherein the anhydride moiety has the structure

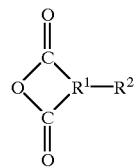

wherein $R^1$ is a dimethylene or trimethylene group, and $R^2$ is selected from the group consisting of alkyl, alkenyl, aralkyl and aralkenyl groups having 2 to 20 carbon atoms;

(c) agitating the slurry containing the starch base material, water and anhydride moiety to form a dispersion; and (d) adding an alkali material to the dispersion to adjust the pH of the dispersion to a pH of greater than about 7 in order to initiate the reaction between the starch base material and anhydride moiety to form a hydrophobically modified starch.

2. In a latex paint composition comprising water, pigment and a latex wherein the latex comprises dispersed colloidal particles of a polymer prepared by emulsion polymerization of at least one ethylenically unsaturated monomer, the improvement comprising conducting the polymerization in the presence of from about 0.1 to about 1 pphm at least one hydrophobically modified starch having the structure

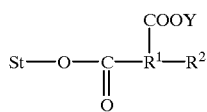

wherein St is a starch base material, $R^1$ is a dimethylene or trimethylene group, $R^2$ is selected from the group consisting of alkyl, alkenyl, aralkyl and aralkenyl groups having 2 to 20 carbon atoms, and Y is selected from the group consisting of hydrogen, alkali metal, alkaline earth metal and ammonium, wherein the hydrophobically modified starch is prepared by a method comprising:

(a) mixing a starch base material with water to form a slurry and adjusting the pH of the slurry to a pH of less than about 7, wherein the slurry contains from about 5 to about 45 weight percent of the starch base material;

(b) adding an anhydride moiety to the slurry wherein the anhydride moiety has the structure

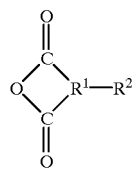

wherein $R^1$ is a dimethylene or trimethylene group, and $R^2$ is selected from the group consisting of alkyl, alkenyl, aralkyl and aralkenyl groups having 2 to 20 carbon atoms;

(c) agitating the slurry containing the starch base material, water and anhydride moiety to form a dispersion; and (d) adding an alkali material to the dispersion to adjust the pH of the dispersion to a pH of greater than about 7 in order to initiate the reaction between the starch base material and anhydride moiety to form a hydrophobically modified starch.

3. A film formed by drying the latex paint composition of claim 1.

4. An article comprising a substrate having at least one surface at least partially coated with the film according to claim 3.

5. The latex paint composition according to claim 2 wherein the hydrophobically modified starch is present in the emulsion in a range of from about 0.3 to about 0.7 pphm.

6. The latex paint composition according to claim 1 wherein the method for making the hydrophobically modified starch further comprises adding additional alkali material to the dispersion to maintain the pH of the dispersion at greater than about 7 until the reaction between the starch base material and anhydride moiety is complete.

7. The latex paint composition according to claim 1 wherein in the method for making the hydrophobically modified starch, the pH in Step (a) is from about 1 to about 6, and the pH in Step (d) is from about 7.1 to about 11.

8. The latex paint composition according to claim 1 wherein in the method for making the hydrophobically modified starch, the pH in Step (a) is from about 2 to about 3, and the pH in Step (d) is from about 8 to about 9.

9. The latex paint composition according to claim 1 wherein in the method for making the hydrophobically modified starch, the amount of anhydride moiety added to the starch base material and water slurry in Step (b) is from about 1 to about 100 weight percent, based on the weight of starch base material in the slurry.

10. The latex paint composition according to claim 9 wherein the amount of anhydride moiety is from about 2 to about 60 weight percent, based on the weight of starch base material in the slurry.

11. The latex paint composition according to claim 10 wherein the amount of anhydride moiety is from about 3 to about 10 weight percent, based on the weight of starch base material in the slurry.

12. The latex paint composition according to claim 1 wherein $R^2$ is an alkyl or alkenyl group having 8 to 12 carbon atoms.

13. The latex paint composition according to claim 1 wherein the alkali material is selected from the group consisting of alkali metal hydroxides, alkaline earth metal hydroxides, Group IA hydroxides, Group IIA hydroxides, oxides, carbonates, and combinations thereof.

14. The latex paint composition according to claim 13 wherein the alkali material is selected from the group consisting of sodium hydroxide, potassium hydroxide, calcium hydroxide, ammonium hydroxide, magnesium hydroxide, sodium carbonate and trisodium phosphate.

15. The latex paint composition according to claim 14 wherein the alkali material is sodium hydroxide.

16. The latex paint composition according to claim 1 wherein the ethylenically unsaturated monomer is selected from the group consisting of vinyl esters, alpha olefins, alkyl esters of acrylic and methacrylic acid, substituted or unsubstituted mono and dialkyl esters of unsaturated dicarboxylic acids, unsaturated carboxylic acids, vinyl aromatics, unsubstituted or substituted acrylamides, cyclic monomers, sulfonated monomers, vinyl amide monomers, and combinations thereof.

17. The latex paint composition according to claim 16 wherein the vinyl esters are selected from the group consisting of vinyl acetate, vinyl formate, vinyl propionate, vinyl butyrate, vinyl isobutyrate, vinyl valerate, vinyl 2-ethyl-hexanoate, vinyl isooctanoate, vinyl nonoate, vinyl decanoate, vinyl pivalate, and vinyl versatate.

18. The latex paint composition according to claim 16 wherein the alkyl esters are selected from the group consisting of methyl acrylate, methyl methacrylate, ethyl acrylate, ethyl methacrylate, and butyl acrylate.

19. The latex paint composition according to claim 16 wherein the substituted or unsubstituted mono and dialkyl esters of unsaturated dicarboxylic acids are selected from the group consisting of substituted and unsubstituted mono and dibutyl, mono and diethyl maleate esters, and the corresponding fumarates of such esters.

20. The latex paint composition according to claim 16 wherein the unsaturated carboxylic acids are selected from the group consisting of crotonic acid, acrylic acid, methacrylic acid, fumaric acid, maleic acid, itaconic acid, and citraconic acid.

21. The latex paint composition according to claim 16 wherein the vinyl aromatic monomers are selected from the group consisting of styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene.

* * * * *